(12) United States Patent
Willard (10) Patent No.: US 6,966,599 B2
(45) Date of Patent: Nov. 22, 2005

(54) CONVERTIBLE ROOF APPARATUS WITH POWER ROOF BOW LINKED TO A TENSIONING BOW

(75) Inventor: Michael Willard, Harrison Township, MI (US)

(73) Assignee: ASC Incorporated, Southgate, MI (US)

( * ) Notice: Subject to any disclaimer, the term of this patent is extended or adjusted under 35 U.S.C. 154(b) by 0 days.

(21) Appl. No.: 10/610,382

(22) Filed: Jun. 30, 2003

(65) Prior Publication Data

US 2004/0262942 A1 Dec. 30, 2004

(51) Int. Cl.7 .............................................. B60J 10/10
(52) U.S. Cl. .......................... 296/107.12; 296/107.09; 296/117
(58) Field of Search ..................... 296/107.12, 107.09, 296/116, 121, 107.07, 118, 214, 117, 122, 296/104, 107.01, 107.08

(56) References Cited

U.S. PATENT DOCUMENTS

| | | | |
|---|---|---|---|
| 2,230,140 A | | 1/1941 | Falcon |
| 2,267,471 A | | 12/1941 | Keller |
| 2,297,820 A | | 10/1942 | Westrope |
| 2,329,802 A | * | 9/1943 | Westrope ..................... 296/117 |
| 2,372,583 A | | 3/1945 | Keller |
| 2,376,949 A | * | 5/1945 | Westrope ..................... 296/117 |
| 2,768,857 A | | 10/1956 | Albrecht |
| 3,075,804 A | * | 1/1963 | Geiger et al. .......... 296/107.12 |
| 4,693,509 A | * | 9/1987 | Moy et al. ............. 296/107.12 |
| 4,708,389 A | * | 11/1987 | Maebayashi et al. .. 296/107.12 |
| 5,002,330 A | * | 3/1991 | Koppenstein et al. .. 296/107.12 |
| 5,004,291 A | * | 4/1991 | Bauer et al. ................ 296/116 |
| 5,042,868 A | | 8/1991 | Nothaft et al. |
| 5,225,747 A | | 7/1993 | Helms et al. |
| 5,259,658 A | * | 11/1993 | Koppenstein et al. .. 296/107.12 |
| 5,385,381 A | * | 1/1995 | Moore et al. ............... 296/117 |
| 5,620,226 A | | 4/1997 | Sautter, Jr. |
| 5,624,149 A | | 4/1997 | Tokarz |
| 5,645,309 A | | 7/1997 | Graf |
| 5,678,881 A | | 10/1997 | Tokarz |
| 5,772,275 A | | 6/1998 | Tokarz |
| 5,779,299 A | | 7/1998 | Purcell et al. |
| 5,816,644 A | * | 10/1998 | Rothe et al. ................ 296/117 |
| 5,903,119 A | | 5/1999 | Laurain et al. |
| 5,918,928 A | * | 7/1999 | Kolb et al. ............ 296/107.12 |
| 5,998,948 A | | 12/1999 | Lange et al. |
| 6,039,382 A | * | 3/2000 | Mather et al. .............. 296/117 |
| 6,048,021 A | * | 4/2000 | Sautter, Jr. ............. 296/107.09 |
| 6,095,589 A | | 8/2000 | Kinnanen et al. |
| 6,114,819 A | | 9/2000 | Porter et al. |
| 6,246,199 B1 | | 6/2001 | Porter et al. |
| 6,288,511 B2 | | 9/2001 | Porter et al. |
| 6,299,233 B1 | | 10/2001 | Mentink |

(Continued)

FOREIGN PATENT DOCUMENTS

DE             3818616     *  6/1989

(Continued)

OTHER PUBLICATIONS

Exhibit A, drawing of No. 4 bow of 1997 Bentley Azure, prior to Aug. 22, 1997, 1 page.

(Continued)

Primary Examiner—Kiran B. Patel
(74) Attorney, Agent, or Firm—Harness, Dickey & Pierce, P.L.C.

(57) ABSTRACT

A convertible roof actuation mechanism includes at least a forward bow, a power actuated rearmost bow and an intermediate bow. A linkage set separately connects the rearmost bow to the intermediate bow. When the forward bow is latched and as the rearmost bow is rearwardly rotated, the linkage set rotates the intermediate bow to tension the roof cover.

45 Claims, 6 Drawing Sheets

U.S. PATENT DOCUMENTS

| | | |
|---|---|---|
| 6,322,130 B1 | 11/2001 | Wanden et al. |
| 6,325,446 B1 * | 12/2001 | Wuellrich et al. ..... 296/107.12 |
| 6,390,530 B1 * | 5/2002 | Maass ................... 296/107.09 |
| 6,499,793 B2 * | 12/2002 | Heselhaus et al. ..... 296/107.12 |
| 6,692,061 B1 * | 2/2004 | Willard ................. 296/107.09 |
| 6,695,385 B1 * | 2/2004 | Lange ................... 296/107.12 |
| 2002/0014782 A1 | 2/2002 | Neubrand |
| 2003/0057728 A1 | 3/2003 | Sims |
| 2003/0146642 A1 * | 8/2003 | Mandl et al. .......... 296/107.12 |

FOREIGN PATENT DOCUMENTS

| | | |
|---|---|---|
| EP | 0 351 378 B1 | 9/1992 |
| JP | 6226119 * | 2/1987 |

OTHER PUBLICATIONS

Exhibit B, 1996 Rolls Royce Comiche convertible top, portion of Rolls Royce Parts, Service and Maintenance CD_ROM, prior to Aug. 22, 1997, 3 pages.

* cited by examiner

CONVERTIBLE ROOF APPARATUS WITH POWER ROOF BOW LINKED TO A TENSIONING BOW

BACKGROUND AND SUMMARY OF THE INVENTION

The present invention relates generally to convertible roofs for automobile vehicles and more specifically to a mechanism to tension a convertible roof.

Vehicle soft tops or pliable convertible roofs, hereinafter referred to as pliable roofs, are commonly supported using a plurality of cross-car elongated support members, or "roof bows". The roof bows are commonly connected to the vehicle by a top stack assembly, having links, rotating connections and support elements. To tension, the pliable roof is often raised from a folded or stowed position until a forward-most roof bow is adjacent the vehicle windshield structure. The pliable roof or forward-most roof bow is latched to the vehicle windshield structure. A rear-most roof bow is commonly connected to a rear structure of the vehicle. For power actuated pliable roofs, an intermediate roof bow is commonly connected to an actuator, such as a hydraulic or mechanical actuator. The actuator rotates the connected roof bow and, via the top stack assembly, the remaining pliable roof sections to an upright and tensioned position. A disadvantage of these systems is the potential to damage the pliable roof by over-rotation or under-rotation of the powered intermediate roof bow. Still another disadvantage is that a backlite section positioned in the rear of the pliable roof can be under-tensioned causing the backlite to vibrate during travel.

In accordance with the preferred embodiment of the present invention, a convertible roof actuation mechanism includes at least a forward bow, a power actuated rearmost bow and an intermediate bow, having a linkage set connecting the rearmost bow to the intermediate bow. In another aspect of the present invention, when the forward bow is latched and as the rearmost bow is rearwardly rotated, the linkage set rotates the intermediate bow to tension the roof cover.

In another embodiment, a pliable roof cover is supported by a plurality of roof bows. A linkage set connectably joins a rear-most bow to an intermediate bow. After a forward-most bow is connected to a vehicle windshield structure, the rear-most bow is positioned adjacent to a vehicle rear structure by an actuator device. The linkage set rotatably positions the intermediate bow in a roof cover tensioned position. In yet another embodiment, a convertible roof tensioning system includes five roof bows and a linkage set connecting a number four bow to a powered number five bow. In still another embodiment, a method to tension a convertible roof cover is provided.

The invention offers several advantages. A linkage set connecting a rearmost roof bow to a next adjacent roof bow allows the powered actuation of the rearmost roof bow to position the next adjacent roof bow, thereby tensioning the roof. All further forward roof bows can be pre-positioned and a forward-most bow latched to windshield structure prior to location of the rearmost bow and tensioning of the pliable roof. Further areas of applicability of the present invention will become apparent from the detailed description and claims provided hereinafter, taken into conjunction with the accompanying drawings. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiment is merely exemplary in nature and is in no way intended to limit the invention, its application, or uses.

Figure 1:
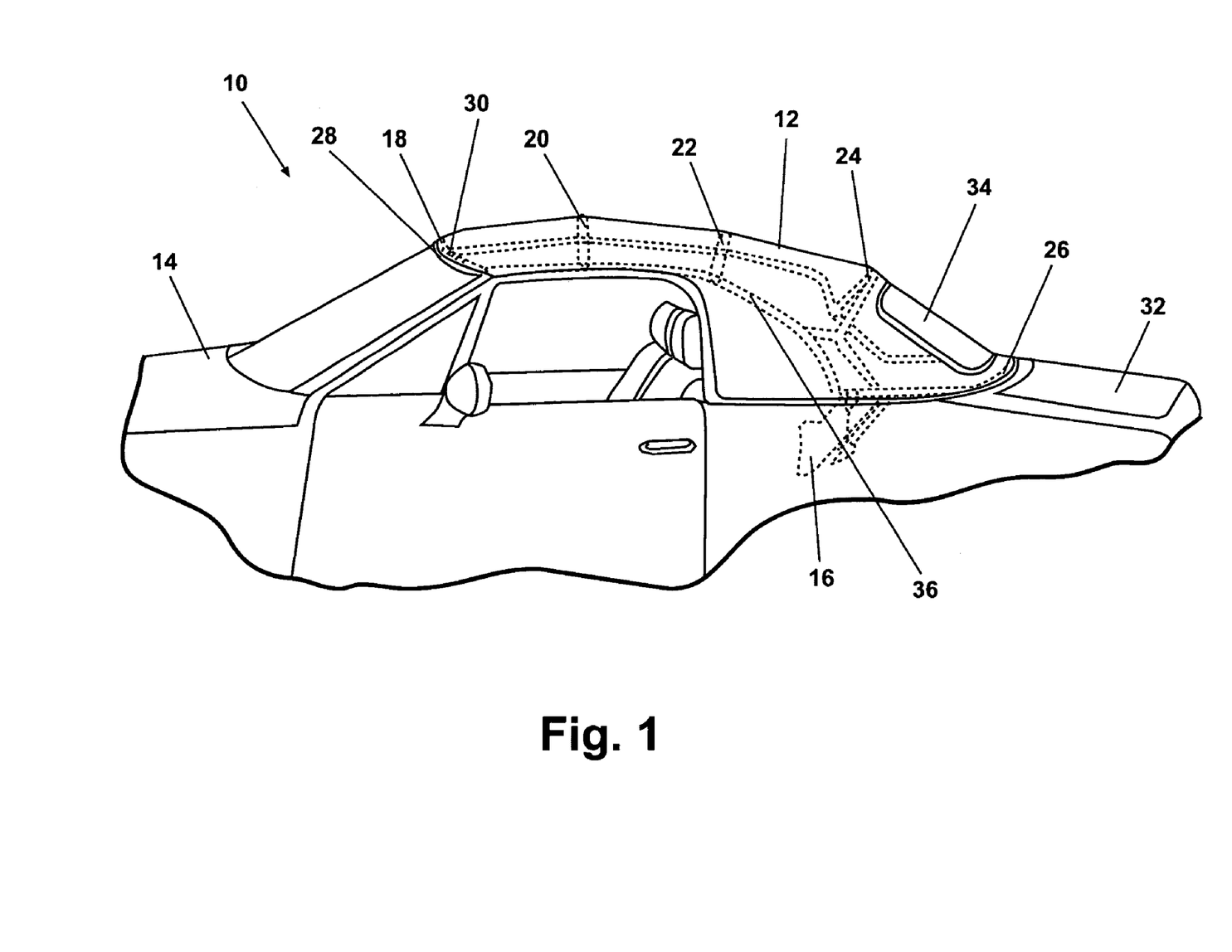
FIG. 1 is a side elevation view of an automotive vehicle incorporating a convertible roof actuation system having a powered roof bow linked to a tensioning roof bow according to a preferred embodiment of the present invention.

According to a preferred embodiment of the present invention, a convertible roof actuation system 10 includes a pliable roof 12 connectably attached to an automobile 14. A top stack assembly 16 is used to deploy the pliable roof 12 between a closed and a fully open position (shown). Pliable roof 12 is supported by five roof bows including a forward-most or number one bow 18, a number two bow 20, a number three bow 22, at least one intermediate or number four bow 24, and a rear-most or number five bow 26. Number one bow 18 is latched to a windshield structure 28 via a latch mechanism 30 in the fully open position of pliable roof 12 and can be latched either automatically or manually. Number five bow 26 contacts a rear structural area 32 in the fully open position of pliable roof 12. Pliable roof 12 also includes a backlight 34 disposed between number four bow 24 and number five bow 26. Opposed sides of pliable roof 12 are supported by/connected to automobile 14 via each of a pair of rear rails 36.

Figure 2:
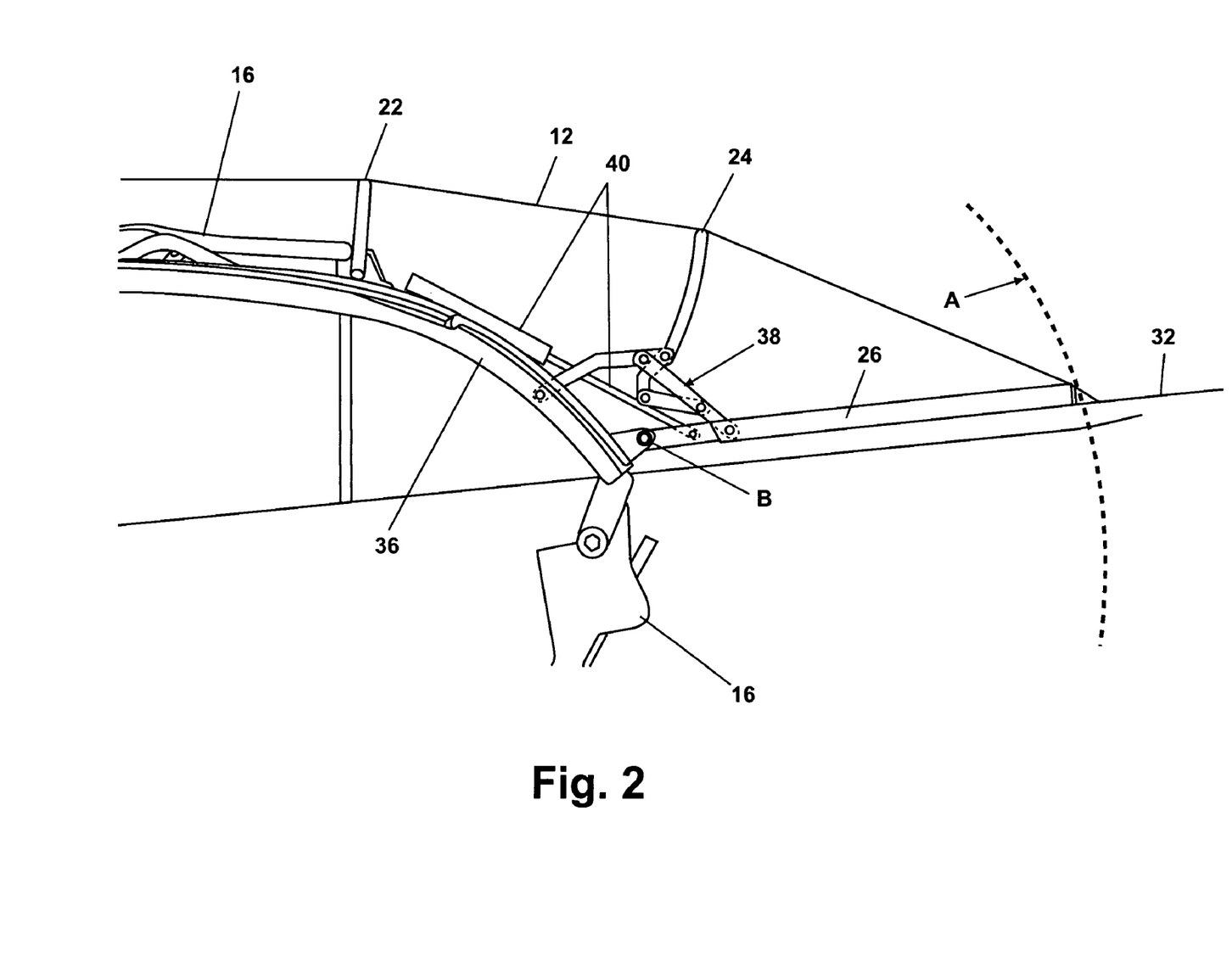
FIG. 2 is a side diagrammatic view showing a portion of the roof mechanism of the present invention.

Referring next to FIG. 2, a linkage set 38 according to the preferred embodiment of the present invention is shown. Linkage set 38 connects number five bow 26 to number four bow 24 and is both connectable and moveable independent of top stack assembly 16. Number five bow 26 is rotatably supported such that number five bow 26 rotates through an arc "A" about center-of-rotation "B". Number five bow 26 is rotatably supported to rear rail 36 by a pinned joint forming center-of-rotation "B". Actuation of pliable roof 12 is by a pair of hydraulic actuators 40 (only one hydraulic actuator 40 is shown for clarity). Each of the pair of hydraulic actuators 40 is rotatably connected at both a first end to structure of one of the pair of rear rails 36, and at a second end to number five bow 26. Each hydraulic actuator 40 includes a piston/cylinder having the first end and a drive rod including the second end. A hydraulically actuated rear-most or number five bow for a convertible roof system is disclosed in U.S. patent application Ser. No. 09/965,109, filed Sep. 26, 2001, entitled "Top Stack Mechanism for a Convertible Roof", the disclosure of which is incorporated herein by reference.

Elements of top stack assembly 16 are also shown in FIG. 2. Such a top stack assembly is disclosed in U.S. Pat. No. 5,998,948, entitled "Convertible Roof Actuation Mechanism" which issued to Piontek et al. on Jun. 27, 1995, and is assigned to the assignee of the present invention, the disclosure of which is incorporated herein by reference. In the fully open or fully deployed position shown in FIG. 2 for pliable roof 12, number five bow 26 is fully rotated in a clockwise direction about arc "A" such that number five bow 26 contacts rear structural area 32 (shown in FIG. 1). Linkage set 38, connected between number five bow 26 and number four bow 24, rotatably positions number four bow to fully tension pliable roof 12 in the "roof tensioned position" shown in FIGS. 1 and 2.

Figure 3:
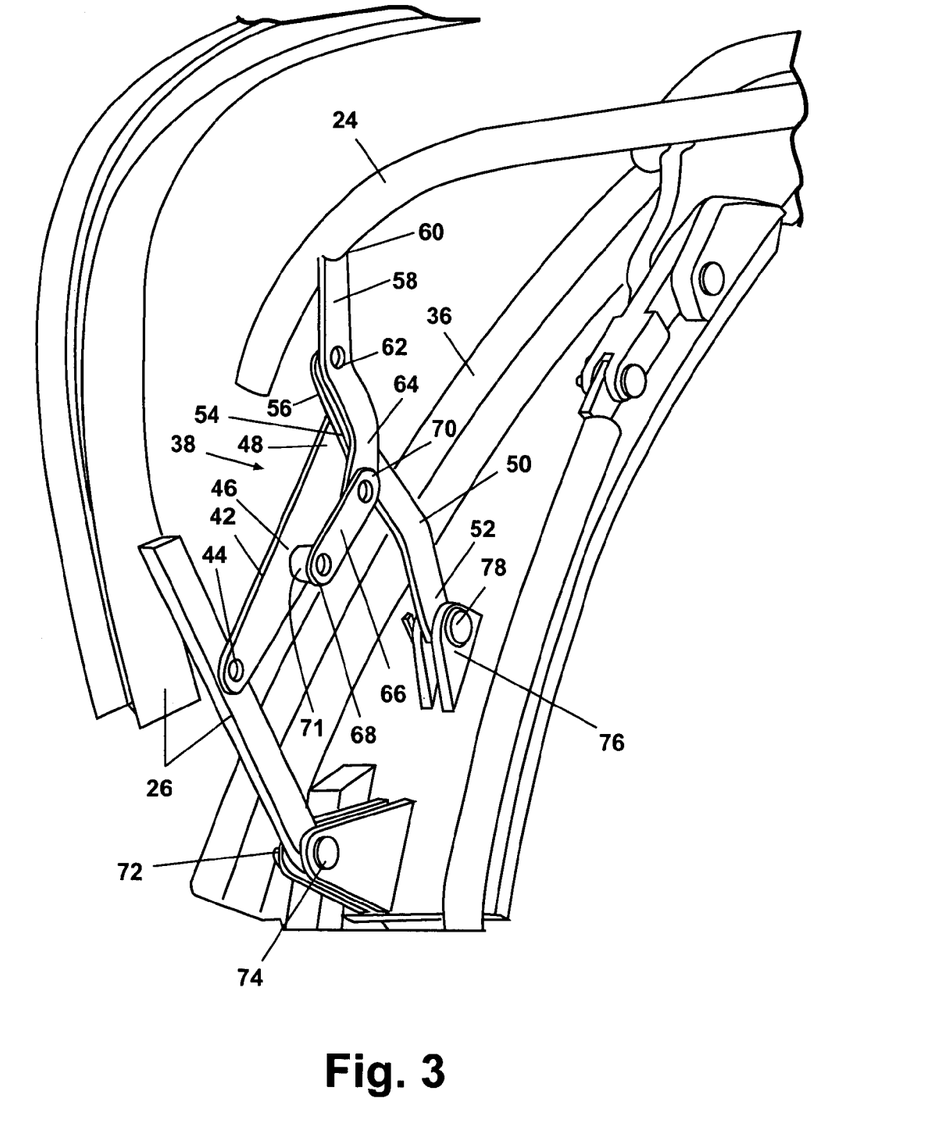
FIG. 3 is a perspective view looking generally forward, detailing the linkage set of the present invention.

As best seen in FIG. 3, linkage set 38 includes a first link 42 having a first end 44, an intermediate location 46, and a second end 48. A second link 50 includes a first end 52, an intermediate location 54, and a second end 56. A bracket 58 includes a bracket first end 60, a bracket intermediate location 62, and a bracket second end 64. A connector 66 includes a connector first end 68 and a connector second end 70. Pin connectors for the rotatable joints joining members of linkage set 38 are best described in reference to FIGS. 5 and 6.

Linkage set 38 is formed as follows. First end 44 of first link 42 is rotatably pinned to number five bow 26. Intermediate location 46 of first link 42 is rotatably connected to connector first end 68 via a pin rotatably supported between first link 42 and connector 66 via a spacer 71. Second end 48 of first link 42 is rotatably connected to intermediate location 54 of second link 50. This connection is not clearly visible in FIG. 3 and is shown in further detail in reference to FIG. 4. Number five bow 26 is rotatably connected to rear rail 36 using a clevis 72 and a pin 74. Second link 50 is rotatably connected to rear rail 36 using a clevis 76 and a pin 78. Second end 56 of second link 50 is rotatably connected to bracket intermediate location 62 via a pin (not shown).

Bracket 58 is fixedly connected to number four bow 24 at bracket first end 60. This connection can be made by brazing, welding or other permanent connection techniques. Bracket 58 is rotatably connected to connector second end 70 at bracket second end 64. A length of spacer 71 is selected based on the thicknesses and clearance requirements for bracket 58 and second link 50 disposed between first link 42 and connector 66 respectively. Linkage set 38 shown in FIG. 3 represents the left hand set, looking generally forward of a pair of linkage sets 34 supporting adjacent ends of number five bow 26 and number four bow 24. A right hand set, not shown, is a mirrored image of FIG. 3.

Figure 4:
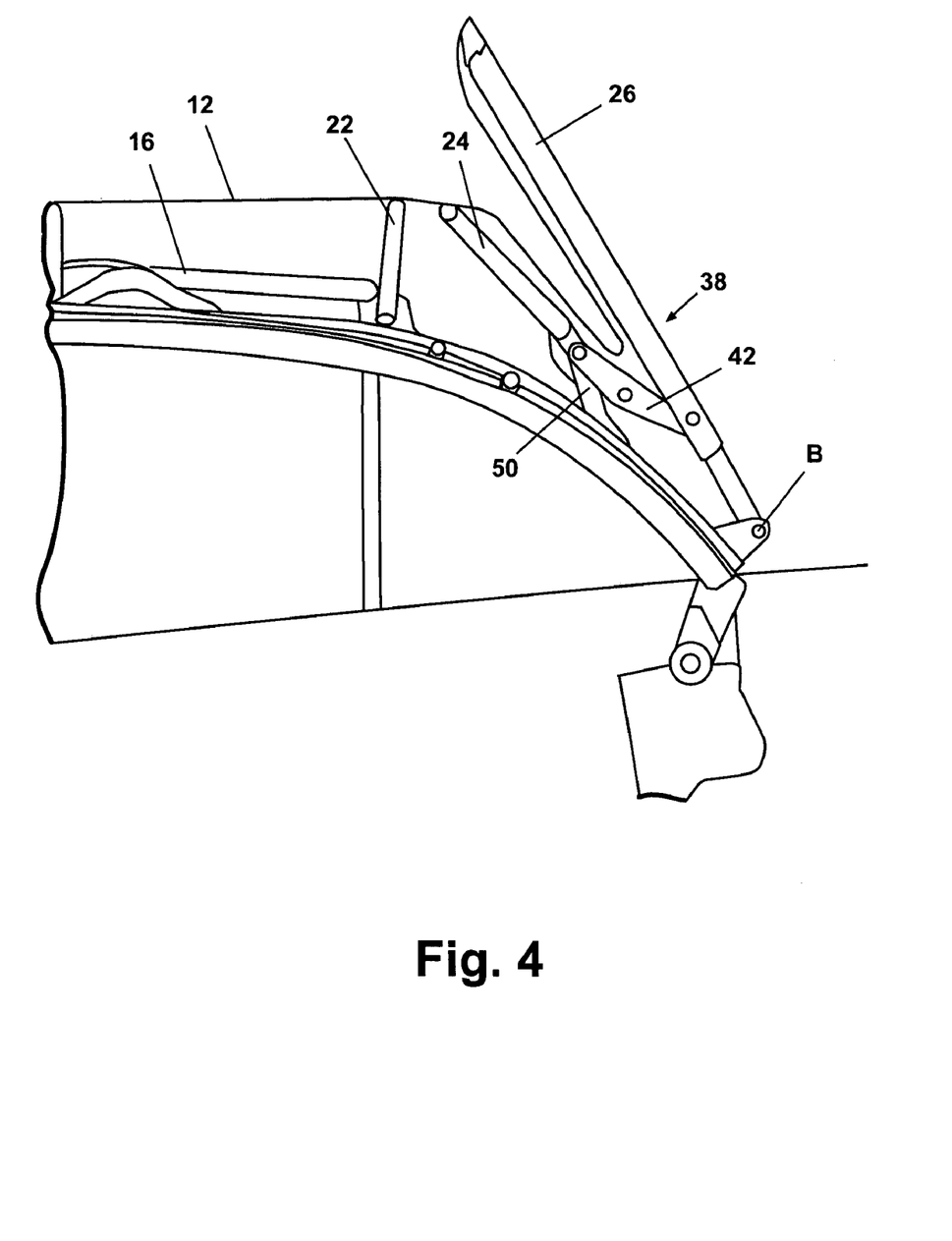
FIG. 4 is an side diagrammatic view of a partially folded convertible roof having the linkage set of the present invention.

As best seen in FIG. 4, linkage set 38 is shown in a fully folded configuration having number five bow 26 fully rotated counterclockwise, as viewed in FIG. 4, about arc "A" (shown in FIG. 2), and number four bow 24 disengaged from the "roof tensioned position" shown in FIG. 1. In the position shown in FIG. 4, the number one, number two and number three bows 18, 20 and 22, respectively, are positioned in their upright positions either prior to complete fold-up or following partial raising of pliable roof 12 using top stack assembly 16.

Figure 5:
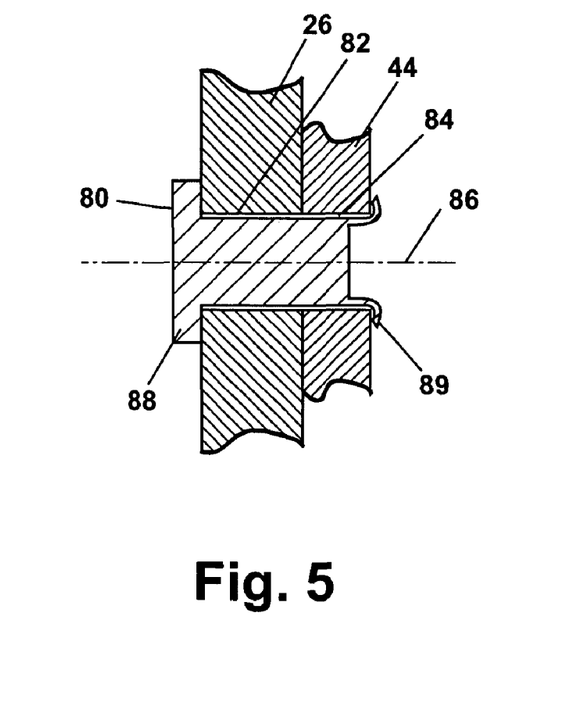
FIG. 5 is a cross-sectional view of an exemplary link-to-link, link-to-bracket, connector-to-bracket, or link-to-connector rotatable joint for the linkage set of the present invention.

As best seen in FIG. 5, an exemplary joining of two member parts of linkage set 38 is shown. Number five bow 26 is shown in cross section rotatably joined to first end 44 of first link 42 by a spin rivet 80. Spin rivet 80 is first passed through an aperture 82 of number five bow 26 and a coaxially aligned aperture 84 of first end 44. Both aperture 82 and aperture 84 are coaxially aligned along an aperture longitudinal axis 86. Diameters for aperture 82 and aperture 84 can vary from each other to suit alignment tolerance(s) for linkage set 38. In the embodiment shown, a head end 88 of spin rivet 80 abuts a surface of number five bow 26. An engagement end 89 of spin rivet 80 is swaged or flared as shown to contact a surface of first end 44 such that number five bow 26 and first end 44 are rotatably joined.

Figure 6:
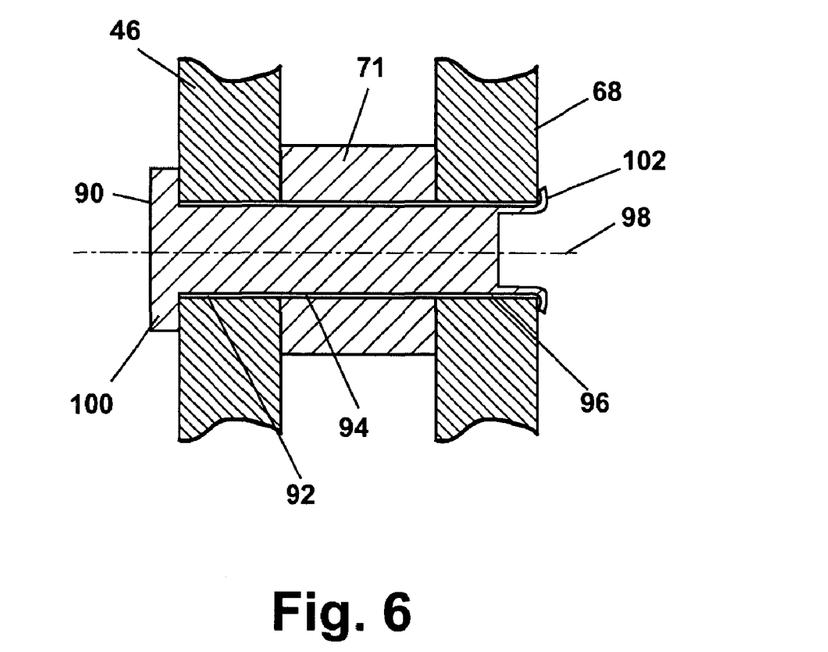
FIG. 6 is a cross-sectional view showing an exemplary link-to-spacer-to-connector rotatable joint for the linkage set of the present invention.

Referring now to FIG. 6, a spin rivet 90, similar to spin rivet 80, is shown connecting intermediate location 46 of first link 42 to connector first end 68, via spacer 71. An aperture 92 is provided in intermediate location 46. An aperture 94 is provided through spacer 71. Similarly, an aperture 96 is provided through connector first end 68. Each of the apertures 92, 94 and 96 are coaxially aligned along aperture axis 98 and can vary in diameter as noted above for apertures 82 and 84. In the embodiment shown, spin rivet 90 is slid into position within each of the apertures 92, 94 and 96 such that a head end 100 engages intermediate location 46, and an engagement end 102 (similar to engagement end 89 of spin rivet 80), is swaged or flared to engage connector first end 68.

Alternately, spin rivets 80 and 90, shown in FIGS. 5 and 6, respectively, can have their head ends reversed from those shown in either FIGS. 5 or 6. The location of the head ends of the spin rivets are determined in part by the clearance requirement (including material thickness) between linkage elements of linkage set 38. Other types of connectors in addition to spin rivets can also be used, including, but not limited to pins with clips inserted through apertures at the ends thereof, standard rivets, or bolts with nuts if clearances permit. Materials for the spin rivets or similar fasteners are typically metallic, such as steel or aluminum, to provide good wear resistance for the rotating parts of linkage set 38. Materials for linkage set 38 links and brackets are preferably metals, including, but not limited to steel, stainless steel or aluminum.

Materials for the roof bows are typically metal, such as aluminum. In alternate embodiments, number one through number five bows 18, 20, 22, 24 and 26, respectively, can also be molded of polymeric material such as nylon 6/6 and reinforced with glass fibers, or formed as a composite of materials, including unfilled nylon 6/6, chopped glass fiber filled nylon 6/6, and/or aluminum or steel. Such a molded roof bow is disclosed in U.S. Pat. No. 5,427,429, entitled "Convertible Top Bow" which issued to Piontek et al. on Jun. 27, 1995, and is assigned to the assignee of the present invention, the disclosure of which is incorporated herein by reference. Such a composite roof bow is disclosed in U.S. Pat. No. 6,282,791 B1, entitled "Method of Making an Automotive Vehicle Convertible Roof" which issued to Patelczyk on Sep. 4, 2001, and is assigned to the assignee of the present invention, the disclosure of which is incorporated herein by reference. Material for the pliable roof 12 can be of a pliable fabric, elastomeric, or composite material.

An exemplary operation of a vehicle convertible roof having a convertible roof actuation system 10 of the present invention is as follows. Pliable roof 12 is initially in a completely folded and stowed position in a rear area of the vehicle. Hydraulic actuators 40 are actuated to rotate pliable roof 12 using top stack assembly 16 to an intermediate position shown in FIG. 4. Number one bow 26 is latched to windshield structure 28, either manually or automatically. Hydraulic actuators 40 are further actuated to rotate pliable roof 12 through arc "A" and about center-of-rotation "B" shown in FIG. 2, in a generally clockwise direction as viewed in FIG. 2, until number five bow 26 contacts rear structural area 32. The powered rotation of number five bow 26 causes simultaneous rotation of number four bow 24, via linkage set 38, to support and tension pliable roof 12 in the "roof tensioned position" shown in FIGS. 1 and 2. Number four bow 24 is thereafter held in the "roof tensioned position" by linkage set 38, until number five bow 26 is rotated to fold pliable roof 12. Retracting or folding pliable roof 12 is accomplished by reversing the preceding steps.

Figure 7:
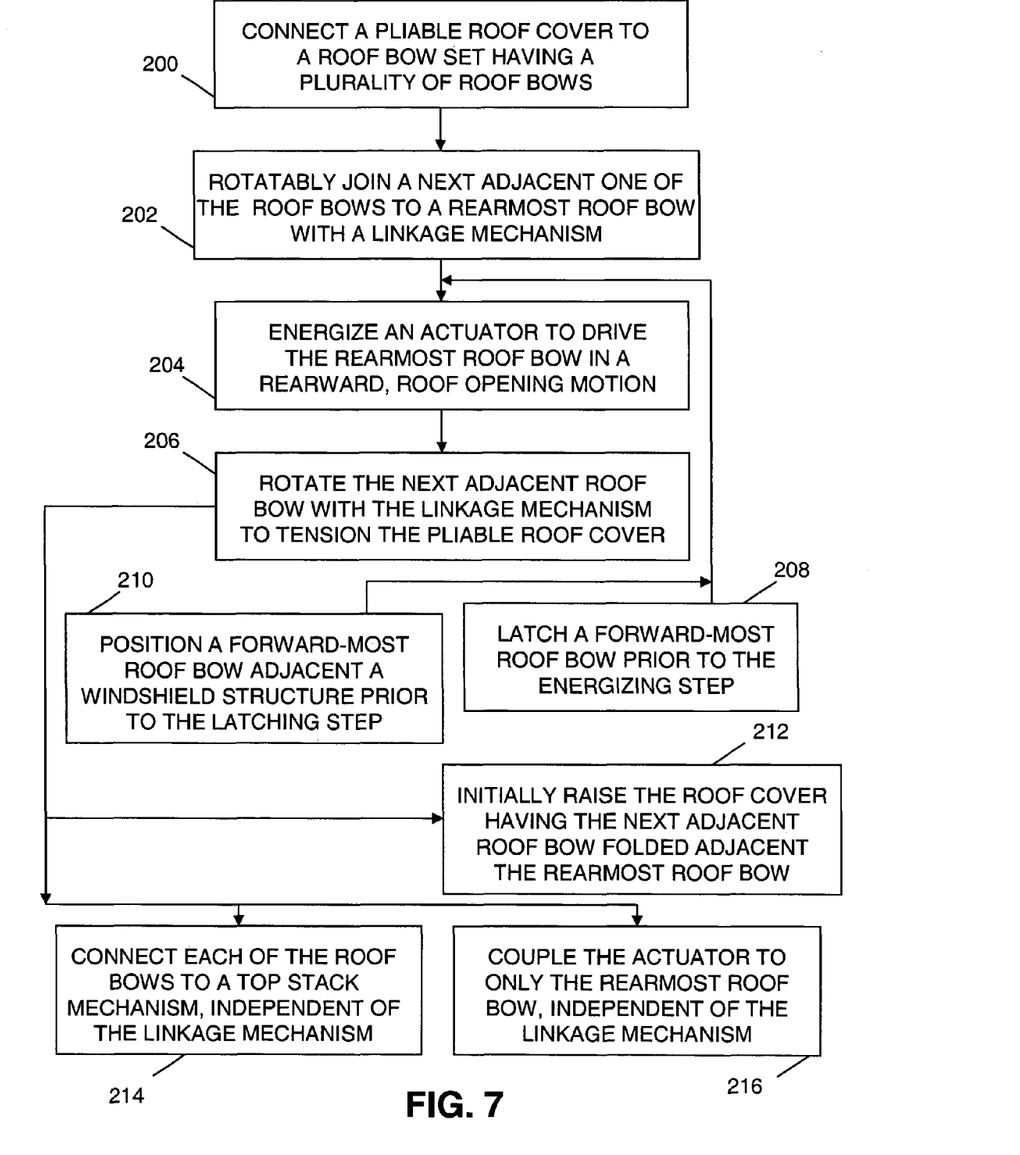
FIG. 7 is a flow diagram identifying the steps to tension a convertible roof using a convertible roof actuation system of the present invention.

As best described in FIG. 7, in a step 200, a pliable roof cover is connected to a roof bow set having five roof bows. In joining step 202, a next adjacent one of the roof bows is rotatably joined to a rearmost roof bow with a linkage mechanism. In step 204, an actuator is energized to drive the rearmost one of the roof bows in a rearward, roof opening motion. In a following step 206, the next adjacent roof bow is rotated with the linkage mechanism to tension the pliable roof cover. Next, in a parallel step 208, a forward-most one of the roof bows is latched prior to the energizing step. In a preceding parallel step 210, the forward-most one of the roof bows is positioned adjacent a windshield structure prior to the latching step. At step 212, the roof cover is initially raised having the next adjacent roof bow folded adjacent to the rearmost roof bow. In step 214, each of the roof bows is connected to a top stack assembly, independent of the linkage mechanism. Finally, in a step 216, the actuator is coupled to only the rearmost roof bow, independent of the linkage mechanism.

A convertible roof actuation system of the present invention offers several advantages. By mechanically linking the number four bow to a power actuated number five bow the number four bow can be rotated to a position which tensions the roof during final placement of the number five bow. Tensioning a pliable roof with a number four bow using a convertible roof actuation system of the present invention permits each of the remaining bows to be prepositioned and the number one bow latched to the windshield structure prior to location of the number five bow and tensioning of the pliable roof.

A convertible roof actuation system of the present invention is not limited by the specific embodiment of the linkage set shown and described herein. Modifications to the linkage set of the present invention can be made without departing from the gist of the present invention, providing that the powered rearmost roof bow is rotatably linked to the next adjacent roof bow, therefore using the next adjacent roof bow to tension the pliable roof of the vehicle. Additionally, a convertible roof actuation system of the present invention is not limited by the number of roof bows. The invention is applicable to a vehicle roof having three or more roof bows, providing that a powered rearmost roof bow is rotatably linked to the next adjacent roof bow. The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A convertible roof actuation mechanism for an automotive vehicle, the mechanism comprising:
    a top stack assembly having a plurality of moveable roof bows, including at least a forward bow, a power actuated rearmost bow and an intermediate bow located between the forward and the rearmost bows;
    a pliable roof cover connectable to the top stack assembly;
    at least one linkage set connecting the rearmost bow to the intermediate bow, the linkage set including:
        a first link connected to the rearmost bow;
        a second link rotatably connected to the first link; and
        a bracket fixedly connected to the intermediate bow and rotatably connected to the second link;
    wherein when the forward bow is in a raised/latched position and the rearmost bow is rearwardly power actuated, the intermediate bow is moveable by the linkage set to a roof cover tensioned position.

2. The mechanism of claim 1, comprising a hydraulic actuator connectable to the rearmost bow.

3. The mechanism of claim 2, wherein the hydraulic actuator comprises a pair of hydraulic piston/cylinders, each connectable to the rearmost bow.

4. The mechanism of claim 1, wherein the linkage set further comprises:
    an end of the first link rotatably connected to the rearmost bow;
    an end of the second link rotatably connected to a rear rail; and
    a connector rotatably connected to both the first link and the bracket.

5. The mechanism of claim 1, further comprising a pair of support bows positioned between the intermediate bow and the forward bow.

6. The mechanism of claim 1, wherein each of the roof bows is longitudinally positionable in a cross-car orientation.

7. A convertible roof actuation mechanism for an automotive vehicle, the mechanism comprising:
    a top stack assembly having a plurality of moveable roof bows, including at least a forward bow, a power actuated rearmost bow and an intermediate bow located between the forward and the rearmost bows;
    a pliable roof cover connectable to the top stack assembly;
    at least one linkage set connecting the rearmost bow to the intermediate bow, the linkage set including:
        a first link connected to the rearmost bow;
        a second link rotatably connected to the first link; and
        a bracket fixedly connected to the intermediate bow and rotatably connected to the second link;
        a first link having a first end, an intermediate location and a second end, the first link rotatably connectable to the rearmost bow at the first link first end;
        a second link having a first end, an intermediate location and a second end, the second link rotatably connectable to a rear rail at the second link first end;
        a fastener rotatably connecting together the first link second end and the second link intermediate location;
        a bracket having a bracket first end fixedly connected to the intermediate bow, a bracket intermediate location rotatably connected to the second link second end, and a bracket second end; and
        a connector having a first end rotatably connectable to the first link intermediate location and a second end rotatably connectable to the bracket second end;
    wherein when the forward bow is in a raised/latched position and the rearmost bow is rearwardly power actuated, the intermediate bow is moveable by the linkage set to a roof cover tensioned position.

8. A convertible roof system for an automotive vehicle, the system comprising:

a pliable roof cover;

five sequentially configured roof bows adaptable to support the roof cover, the roof bows including a first, second, third, fourth and fifth roof bow, the first roof bow latchable proximate to a windshield of the vehicle, the fifth roof bow being a vehicle rear-most positioned bow, and the fourth roof bow being forward of and proximate to the fifth roof bow and operable to tension the pliable roof cover;

a pair of actuators each directly connected to the fifth roof bow to operably rotate the fifth roof bow both forwardly and rearwardly with respect to the vehicle; and a linkage set directly connecting the fifth roof bow to the fourth roof bow the linkage set having at least two articulating link elements rotatable relative to each other;

wherein when the fifth roof bow is rotated rearwardly by the pair of actuators, the fourth roof bow is moveably positioned by the linkage set to a roof cover tensioned position.

9. The roof system of claim 8, wherein the second and third roof bows are located between the first roof bow and the fourth roof bow.

10. The roof system of claim 8, comprising a roof cover stowed position having the five roof bows adjacently folded about the top stack assembly.

11. The roof system of claim 8, comprising an opposed pair of sides of the fifth roof bow each connectably attached to one of the pair of actuators.

12. The roof system of claim 8, comprising a top stack assembly interlinking each of the roof bows, independent of the linkage set.

13. The roof system of claim 8, comprising a roof cover semi-open position having both the fifth roof bow and the fourth roof bow adjacently folded about the linkage set, and remaining ones of the five roof bows in fully extended positions.

14. A convertible roof tensioning system for an automotive vehicle, said system comprising:

a roof bow set having at least five roof bows each elongated in a substantially cross car direction, and each interlinked by a top stack linkage system, the roof bow set including a number one bow releasably connectable to the vehicle, a number four bow rearwardly located from the number one bow when raised, and a rear-most number five bow rearwardly located from and proximate to the number four bow when raised;

an automatic actuator system directly connectable to the number five bow; and a multiple link articulated mechanism joining the number five bow and the number four bow independently of the top stack linkage system wherein when the number five bow is moved from a first partially extended position to a second fully extended position by the actuator system, the number four bow is movable to a roof tensioned position by the articulated mechanism.

15. The tensioning system of claim 14, comprising a plurality of fasteners for connectably joining the number five bow to the number four bow with the mechanism.

16. The tensioning system of claim 15, wherein the plurality of fasteners comprises at least one pin and clevis pair.

17. The tensioning system of claim 15, wherein the plurality of fasteners comprises at least one rivet.

18. The tensioning system of claim 14, wherein the actuator system comprises a pair of hydraulic actuators.

19. The tensioning system of claim 18, wherein each of the hydraulic actuators includes a rotatable connector joined to the number five bow.

20. The tensioning system of claim 14, comprising:

a number two bow rearwardly located from the number one bow; and a number three bow rearwardly located from the number two bow and forwardly located from the number four bow.

21. The tensioning system of claim 14, wherein the mechanism comprises a metal material.

22. A mechanically linked retractable roof system for an automotive vehicle, the system comprising:

(a) a top stack linkage mechanism having opposed side rails;

(b) at least four roof bows spanning between the side rails, including a forward-most roof bow, a second roof bow proximate to the forward-most roof bow, a rearmost fourth roof bow and a third roof bow positioned proximate to and forward of the fourth roof bow when raised; and (c) a pair of connecting mechanisms operable independent of the top stack mechanism, the connecting mechanisms moveably joining the fourth roof bow to the third roof bow, each of the connecting mechanisms including:

(i) a first link connectable to the fourth roof bow;

(ii) a second link connectable to both the first link and one of the side rails;

(iii) a bracket connectable to both the third roof bow and the second link; and (iv) a connector operably joining the first link to a bracket second end.

23. The roof system of claim 22, wherein each of the connecting mechanisms further comprise:

a bracket first end fixedly connectable to the third roof bow;

a bracket intermediate location rotatably connectable to the second link;

a connector first end rotatably connectable to the first link at a first link intermediate location; and a connector second end rotatably connectable to the bracket second end.

24. A method for operating a convertible roof of an automotive vehicle, the roof including a pliable roof cover connected to a plurality of roof bows, a rearmost one of the roof bows rotatably joined to a proximate one of the roof bows with a linkage mechanism, the method comprising:

raising the convertible roof from a stowed position to an intermediate position;

energizing an actuator to drive the rearmost roof bow in a rearward, roof extending motion;

connecting a plurality of articulated links to create the linkage mechanism between the rearmost one of the roof bows and the proximate one of the roof bows; and rotating the proximate one of the roof bows with the linkage mechanism to tension the pliable roof cover.

25. The method of claim 24, comprising latching a forward-most one of the roof bows prior to the energizing step.

26. The method of claim 25, comprising positioning the forward-most one of the roof bows adjacent a windshield structure prior to the latching step.

27. The method of claim 25, comprising:
unlatching the forward-most one of the roof bows following the rotating step; and
returning the convertible roof to the stowed position using the actuator.

28. The method of claim 24, comprising initially raising the roof cover having the next adjacent one of the roof bows folded adjacent to the rearmost one of the roof bows.

29. The method of claim 24, comprising spacing each of the roof bows using a top stack assembly during the raising step, independent of the linkage mechanism.

30. A convertible roof actuation mechanism for an automotive vehicle, the mechanism comprising:
a pliable roof cover;
a plurality of roof bows adaptable to support the roof cover, the plurality of roof bows including at least a forward-most bow latchable to the vehicle, a rear-most bow, and an intermediate bow positioned proximate to the rear-most bow; and
a linkage set having a plurality of links and at least one connecting element connectably joining the rear-most bow to the intermediate bow;
wherein when the rear-most bow is rearwardly positioned the intermediate bow and the pliable roof cover are moveably positioned by the linkage set in a roof cover tensioned position.

31. The mechanism of claim 30, wherein the plurality of roof bows comprises a total quantity of five roof bows.

32. The mechanism of claim 31, wherein the total quantity of five roof bows further comprises a pair of roof bows located between the forward-most bow and the intermediate bow.

33. The mechanism of claim 30, comprising a roof cover stowed position having the plurality of roof bows adjacently folded about the linkage set.

34. The mechanism of claim 33, further comprising:
a pair of actuators; and
an opposed pair of sides of the rear-most bow each connectably attached to one of the pair of actuators;
wherein the pair of actuators are operable to position the roof cover between each of the stowed position and the roof cover tensioned position.

35. The mechanism of claim 30, comprising a top stack assembly interlinking each of the roof bows, independent of the linkage set.

36. The mechanism of claim 30, comprising a roof cover semi-open position having both the rear-most bow and the intermediate bow adjacently folded about the linkage set, and remaining ones of the plurality of roof bows each in a fully extended position.

37. A convertible roof actuation mechanism for an automotive vehicle, the mechanism comprising:
a roof bow set having a plurality of roof bows each elongated in a substantially cross car direction;
a top stack assembly interlinking each of the roof bows; and
a pair of multiple link articulated mechanisms joining a rearmost one of the roof bows to a proximate one of the roof bows;
wherein when the rearmost bow is moved from a first partially extended position to a second fully extended position, the proximate one of the roof bows is movable to a roof tensioned position by the mechanisms.

38. The mechanism of claim 37, wherein the roof bow set further comprises:
a number one bow releasably connectable to the vehicle;
a number two bow rearwardly located from the number one bow; and
a number three bow rearwardly located from the number two bow and forwardly located from the proximate one of the roof bows.

39. The mechanisms of claim 38, comprising a plurality of fasteners for connectably joining the rearmost bow to the proximate one of the roof bows with the mechanisms.

40. The mechanism of claim 39, wherein the plurality of fasteners comprises at least one pin and clevis pair.

41. The mechanism of claim 39, wherein the plurality of fasteners comprises at least one rivet.

42. The mechanism of claim 37, further comprising an automatic actuator system directly connectable to the rearmost bow, wherein the actuator system includes a pair of hydraulic actuators.

43. The mechanism of claim 42, wherein each of the hydraulic actuators includes a rotatable connector joined to the rearmost bow.

44. The mechanism of claim 37, wherein the top stack linkage system further comprises a plurality of links each formed of a metal material.

45. The mechanism of claim 37, further comprising:
an opposed pair of side rails of the top stack assembly; and
each of the mechanisms being operable independent of the top stack assembly, the mechanisms moveably joining the rearmost bow to the proximate one of the roof bows each of the connecting mechanisms including:
(a) a first link connectable to the rearmost bow;
(b) a second link connectable to both the first link and one of the side rails;
(c) a bracket connectable to both the proximate one of the roof bows and the second link; and
(d) a connector operably joining the first link to a bracket second end.

* * * * *

UNITED STATES PATENT AND TRADEMARK OFFICE
CERTIFICATE OF CORRECTION

PATENT NO. : 6,966,599 B2 Page 1 of 1
DATED : November 22, 2005
INVENTOR(S) : Willard It is certified that error appears in the above-identified patent and that said Letters Patent is hereby corrected as shown below:

<u>Column 6,</u>
Line 15, "to.a" should be -- to a --.

Signed and Sealed this

Eighteenth Day of April, 2006

JON W. DUDAS
*Director of the United States Patent and Trademark Office*